2 Sheets--Sheet 1.

EDWIN G. SCOTT.
Improved Peanut Thrasher and Gin.

No. 125,338. Patented April 2, 1872.

Witnesses:

Inventor

2 Sheets--Sheet 2.

EDWIN G. SCOTT.
Improved Peanut Thrasher and Gin.

No. 125,338.            Patented April 2, 1872.

Witnesses:            Inventor
Henry N. Miller.        Edwin G. Scott,
C. L. Evert.           per Alexander Mason,
                                      Attorneys.

UNITED STATES PATENT OFFICE.

EDWIN G. SCOTT, OF WAVERLY, VIRGINIA.

IMPROVEMENT IN PEA-NUT THRASHERS AND GINS.

Specification forming part of Letters Patent No. 125,338, dated April 2, 1872.

*To all whom it may concern:*

Be it known that I, EDWIN G. SCOTT, of Waverly, in the county of Sussex and in the State of Virginia, have invented certain new and useful Improvements in Pea-Nut Thrasher and Gin; and do hereby declare that the following is a full, clear, and exact description thereof, reference being had to the accompanying drawing, and to the letters of reference marked thereon making a part of this specification.

The nature of my invention consists in the construction and arrangement of a "pea-nut thrasher and gin," as will be hereinafter more fully set forth.

In order to enable others skilled in the art to which my invention appertains to make and use the same, I will now proceed to describe its construction and operation, referring to the annexed drawing, in which—

Figure 1:
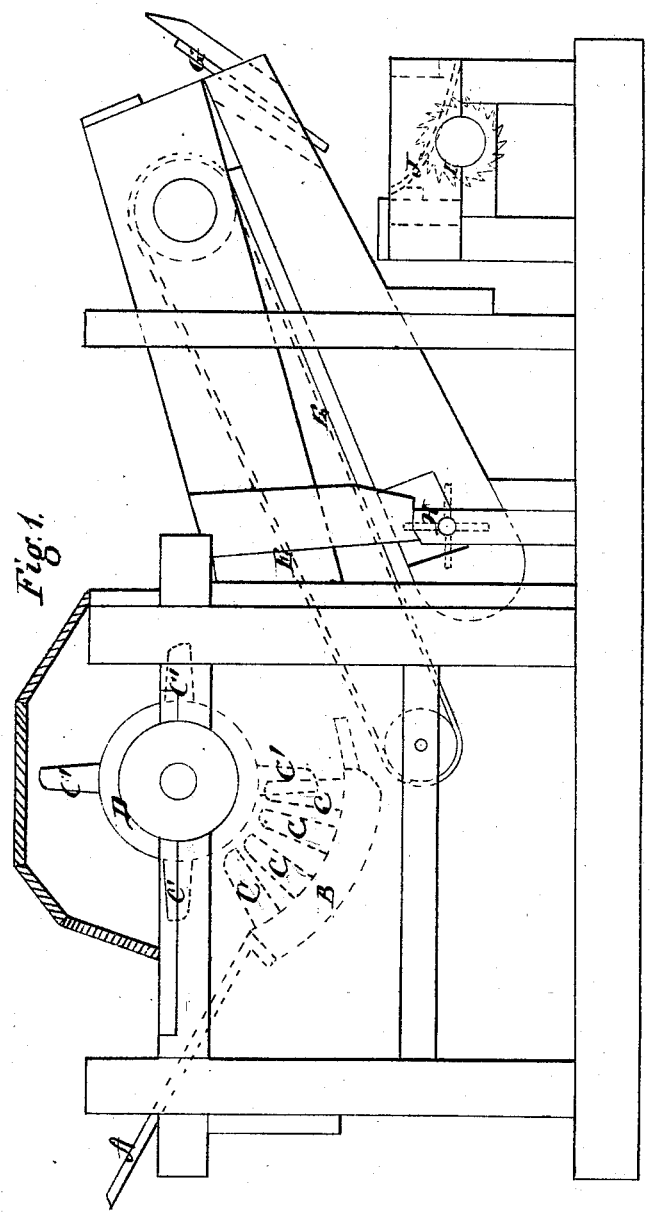
Figure 2:
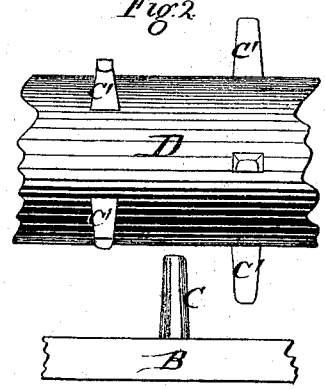
Figure 3:
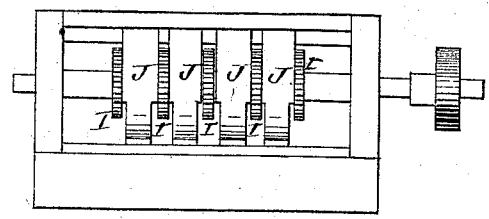
Figure 4:
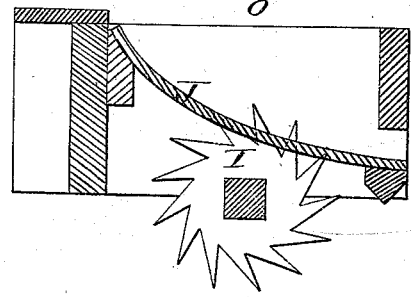

Figure 1 is a side elevation of my entire machine; and Figs. 2, 3, and 4, are detached views of certain parts of the same.

A represents the inclined table, upon which the pea-nut vines are placed and fed to the machine. At the inner edge of said table and extending downward, is a concave, B, provided with pins C C, and above said concave is a revolving cylinder or roller, D, provided with similar pins or teeth C' C'. The length as well as the diameter of the cylinder D is immaterial; it may be of any desired dimensions; but the pins or teeth C' should be from two and three-fourths to three inches apart, neither more nor less, as I have found by practice that this is the only proper distance; as, if they were closer together or further apart, the pea-nuts and the vines will not be properly separated. These pins or teeth are five-eighths of an inch square at the base and tapering, being one and one-fourth inch long, rounded on the front side so as to present no angles to the vines. The stationary pins or teeth C C are of exactly the same shape, but one and one-half inches long. After passing through the teeth C and C', the pea-nuts and vines fall down onto an endless apron, E, arranged in an inclined position, which apron carries it up and onto an inclined board, G, all the light stuff being blown off by a blast or draught from a fan, H, located under the apron E. From the inclined board G the vines and peas fall down on a gin, composed of a series of saws, I I, working between curved or inclined bars J J, as shown in Figs. 3 and 4. The spaces between said bars in front of the saws should just be such that the pea-nuts cannot fall through, while the vines are drawn down by the saws, or cut up and fall down. The teeth of the saws I I should be three-sixteenths of an inch wide, and extend three-eighths of an inch above the bars J J.

Having thus fully described my invention, what I claim as new, and desire to secure by Letters Patent, is—

The combination of the concave B, with teeth C, roller D with teeth C', endless apron E, inclined board G, fan H, and gin I J, all constructed and arranged substantially as and for the purposes herein set forth.

In testimony that I claim the foregoing I have hereunto set my hand this 26th day of January, 1872.

EDWIN G. SCOTT.

Witnesses:
   EDM. F. BROWN,
   C. L. EVERT.